United States Patent [19]

Van Deuren

[11] 4,161,139

[45] Jul. 17, 1979

[54] CONDITIONING APPARATUS

[75] Inventor: Franciscus Van Deuren, Boxtel, Netherlands

[73] Assignee: Simon-Heesen B.V., Boxtel, Netherlands

[21] Appl. No.: 901,824

[22] Filed: May 1, 1978

[30] Foreign Application Priority Data

May 11, 1977 [NL] Netherlands ............ 7705234

[51] Int. Cl.² ............ A01J 11/04; A01J 13/00
[52] U.S. Cl. ............ 99/467; 99/483; 99/485
[58] Field of Search ............ 99/467, 471, 472, 473, 99/477, 483, 485, 484, 352

[56] References Cited

U.S. PATENT DOCUMENTS

| | | | |
|---|---|---|---|
| 2,801,087 | 7/1957 | Hawk | 99/483 |
| 2,815,289 | 12/1957 | Murray | 99/467 |
| 4,057,391 | 11/1977 | Yamaguchi | 99/483 |

*Primary Examiner*—Robert W. Jenkins
*Attorney, Agent, or Firm*—Strauch, Nolan, Neale, Nies & Kurz

[57] ABSTRACT

Apparatus for the treatment of animal feedstuff prior to pelletizing thereof comprising a conditioning vessel and at least one sterilization vessel, each of which is in the form of a cylindrical drum, means for feeding the material to be treated through the conditioning vessel where steam or other a additive can be applied, means for passing material from the conditioning vessel to the sterilization vessel or vessels and means for discharging material from the sterilization vessel or vessels after a required residence time therein, said conditioning vessel and said sterilization vessel or vessels being arranged in spaced apart relationship and connected by walls to form an integral structure having a single chamber between said vessels through which a heating medium may be passed, thus to heat the contents of both the conditioning vessel and the or each sterilization vessel.

7 Claims, 4 Drawing Figures

CONDITIONING APPARATUS

This invention concerns the production of animal feedstuff.

The majority of animal feedstuff is pelletised for the purposes of distribution and sale as it is most conveniently handled in a pelletised form.

The materials fed to the pelletising press normally require conditioning as, for example, by treatment with steam and/or the addition of a suitable binder such as molasses, for example.

It is desirable to sterilise animal feedstuff before distribution in order to ensure that harmful bacteria such as salmonella, for example, are destroyed.

The present invention is based upon an appreciation of the possibility of providing apparatus for carrying out conditioning and sterilisation of animal feedstuff prior to pelletising thereof in an economic manner.

According to the present invention apparatus for the treatment of animal feedstuff prior to pelletising thereof comprises a conditioning vessel and at least one sterilisation vessel, each of which is in the form of a cylindrical drum, means for feeding the material to be treated through the conditioning vessel, where steam or other additive can be applied, means for passing material from the conditioning vessel to the sterilisation vessel or vessels and means for discharging material from the sterilisation vessel or vessels after a required residence time therein, said conditioning vessel and said sterilisation vessel or vessels being arranged in spaced apart relationship and connected by walls to form an integral structure having a single chamber between said vessels through which a heating medium may be passed, thus to heat the contents of both the conditioning vessel and the or each sterilisation vessel.

The invention will be further apparent from the following description with reference to the several figures of the accompanying drawing which show, by way of example only, one form of treatment apparatus embodying the invention.

Figure 1:
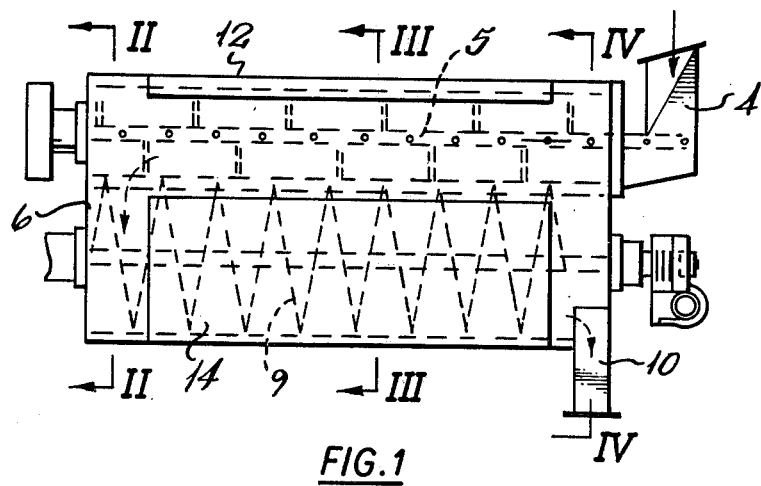
FIG. 1 shows a diagrammatic side elevation of the treatment apparatus.

Referring now to the drawing, it will be seen that the apparatus is essentially comprised by a conditioning vessel 1 and two sterilisation vessels 2 and 3 respectively, all in the form of cylindrical drums of substantially equal length.

The vessels 1, 2 and 3 are arranged in parallel mutually spaced relationship with their axes extending horizontally or substantially so. The conditioning vessel 1 is equipped with a feed chute 4 through which material to be treated is introduced to the apparatus. A rotatably driven agitator 5 extends within the vessel 1 and serves to convey material through the vessel from the feed chute 4 to a discharge outlet 6 at the opposite end of the vessel 1 from the chute 4. Means (not shown) for supplying steam or other additive to the conditioning vessel 1 is provided.

The vessels 2 and 3 are arranged symmetrically beneath the vessel 1 and have inlets 7 and 8 respectively (see FIG. 2) for reception of material which has left the vessel 1 through the discharge outlet 6. A screw conveyor 9 is provided within each of the vessels 2 and 3 and serves to convey material through such vessels for discharge through an outlet 10 at the opposite end of the vessels 2 and 3 from the inlets 7 and 8.

The direction of passage of material through the apparatus is shown by arrows on the several figures of the drawing.

The three vessels are joined by walls 11 extending tangentially between each adjacent pair thereof so that the vessels and walls define a single chamber therebetween.

It will be understood that a portion of the peripheral wall of each of the three vessels is not covered by the walls 11. These portions are formed as removeable covers 12, 13 and 14 respectively which can be opened or removed to permit inspection and maintenance of the interiors of the vessels.

The space between the inwardly directed portions of the three vessels and the walls 11 forming said chamber is closed at its opposite ends. Means is provided (not shown) for conveying steam or some other heating medium through the chamber to cause material in all three vessels to be heated to and maintained at a required temperature.

Figure 2:
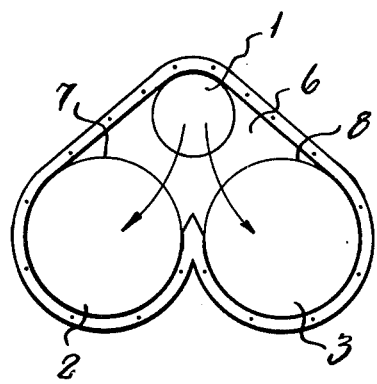
FIGS. 2, 3 and 4 show cross-sections through the apparatus on the lines II—II, III—III, and IV—IV of FIG. 1 respectively.
Figure 3:
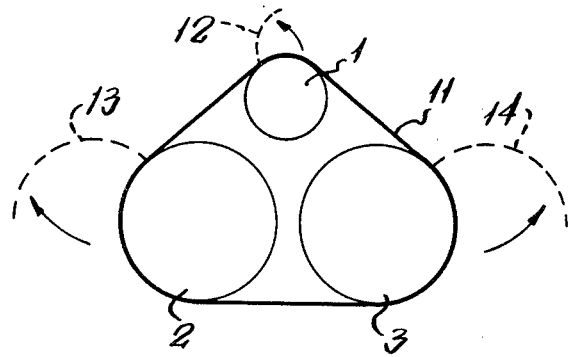
Figure 4:
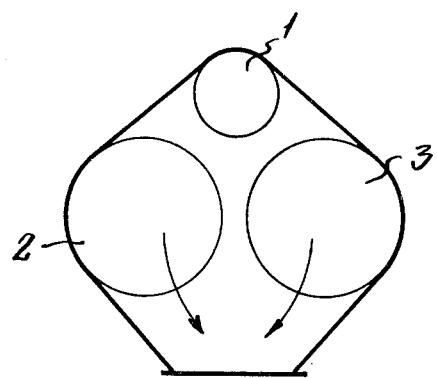

As indicated in FIG. 2, the exterior wall of the apparatus may be of double-walled or insulated construction to minimise heat loss.

It will be appreciated that it is not intended to limit the invention to the above example only, many variations, such as might readily occur to one skilled in the art, being possible without departing from the scope thereof.

Thus, for example, instead of providing two sterilisation vessels a single such vessel or indeed more than two such vessels may be provided. Obviously the apparatus will be designed so that the designed throughput of the conditioning vessel can be accommodated in such sterilisation vessels as are provided for the required time to achieve sterilisation before discharge from the apparatus.

What is claimed is:

1. Apparatus for the treatment of animal feedstuff prior to pelletising thereof comprising a conditioning vessel and at least one sterilisation vessel, each of which is in the form of a cylindrical drum, means for feeding the material to be treated through the conditioning vessel where steam or other additive can be applied, means for passing material from the conditioning vessel to the sterilisation vessel or vessels and means for discharging material from the sterilisation vessel or vessels after a required residence time therein, said conditioning vessel and said sterilisation vessel or vessels being arranged in spaced apart relationship and connected by walls to form an integral structure having a single chamber between said vessels through which a heating medium may be passed, thus to heat the contents of both the conditioning vessel and the or each sterilisation vessel.

2. Treatment apparatus according to claim 1 wherein said walls extend tangentially from the peripheries of the vessels.

3. Treatment apparatus according to claim 2 wherein there are two sterilisation vessels located symmetrically beneath a single conditioning vessel and which form with the interconnecting wall sections a structure of generally triangular cross-section.

4. Treatment apparatus according to claim 1 wherein there are two sterilisation vessels located symmetrically beneath a single conditioning vessel and which form with the interconnecting wall sections a structure of generally triangular cross-section.

5. Treatment apparatus according to claim 4 wherein outwardly facing portions of the periphery of each vessel are formed as removeable covers to permit access to the interior of the vessels for inspection and maintenance.

6. Treatment apparatus according to claim 1 wherein outwardly facing portions of the periphery of each vessel are formed as removeable covers to permit access to the interior of the vessels for inspection and maintenance.

7. Treatment apparatus according to claim 1 wherein the exterior walls of the apparatus are of double-walled or insulated construction.

* * * * *